INVENTOR.
Robert C. Schniers
His Attorney

July 27, 1965 R. C. SCHNIERS 3,196,904
FLUID PRESSURE SYSTEM AND VALVE CONTROL ASSEMBLY THEREFOR
Filed July 23, 1962 3 Sheets-Sheet 3

INVENTOR.
Robert C. Schniers
BY
O.D. McGrant
His Attorney

United States Patent Office 3,196,904
Patented July 27, 1965

3,196,904
FLUID PRESSURE SYSTEM AND VALVE
CONTROL ASSEMBLY THEREFOR
Robert C. Schniers, Flint, Mich., assignor to General Motors Corporation, Detroit, Mich., a corporation of Delaware
Filed July 23, 1962, Ser. No. 211,490
13 Claims. (Cl. 137—628)

The invention relates to a fluid pressure system and a brake pedal actuated release valve in a vehicle cruise control system. In one of its aspects it more particularly relates to a cruise control mode release valve for use in a vehicle cruise control system which in one mode of operation maintains the vehicle at a predetermined road speed under varying conditions. The mechanism and system embodying the invention provide for discontinuance of the cruise control mode of operation upon application of the vehicle brakes through the cruise mode control line and also provides a secondary release by directly venting the cruise control chamber of the power servo of the system upon sufficient brake pedal movement. Systems to which the valve may be adapted are also disclosed in the copending application Serial No. 67,820, now patent No. 3,088,538 entitled Vehicle Speed Warning and Cruise Control System, and filed November 7, 1960; the copending application Serial No. 211,491, entitled Vehicle Speed Warning and Cruise Control System with Preengagement Inhibiting Means, and filed July 23, 1962, now Patent No. 3,157,244; and the copending application Serial No. 211,763, entitled Vehicle Speed Warning and Cruise Control System, and filed July 23, 1962, now Patent No. 3,109,507. The related disclosures of each of these applications are therefore specifically referred to below and incorporated herein by reference. Valves embodying the invention may also be used in systems wherein raw vacuum is controlled by the valves in introducing it to the control head and vacuum controlled by the control head is controlled by the valves before being introduced to the power unit to engage the system in the cruise control mode of operation.

Figure 1:
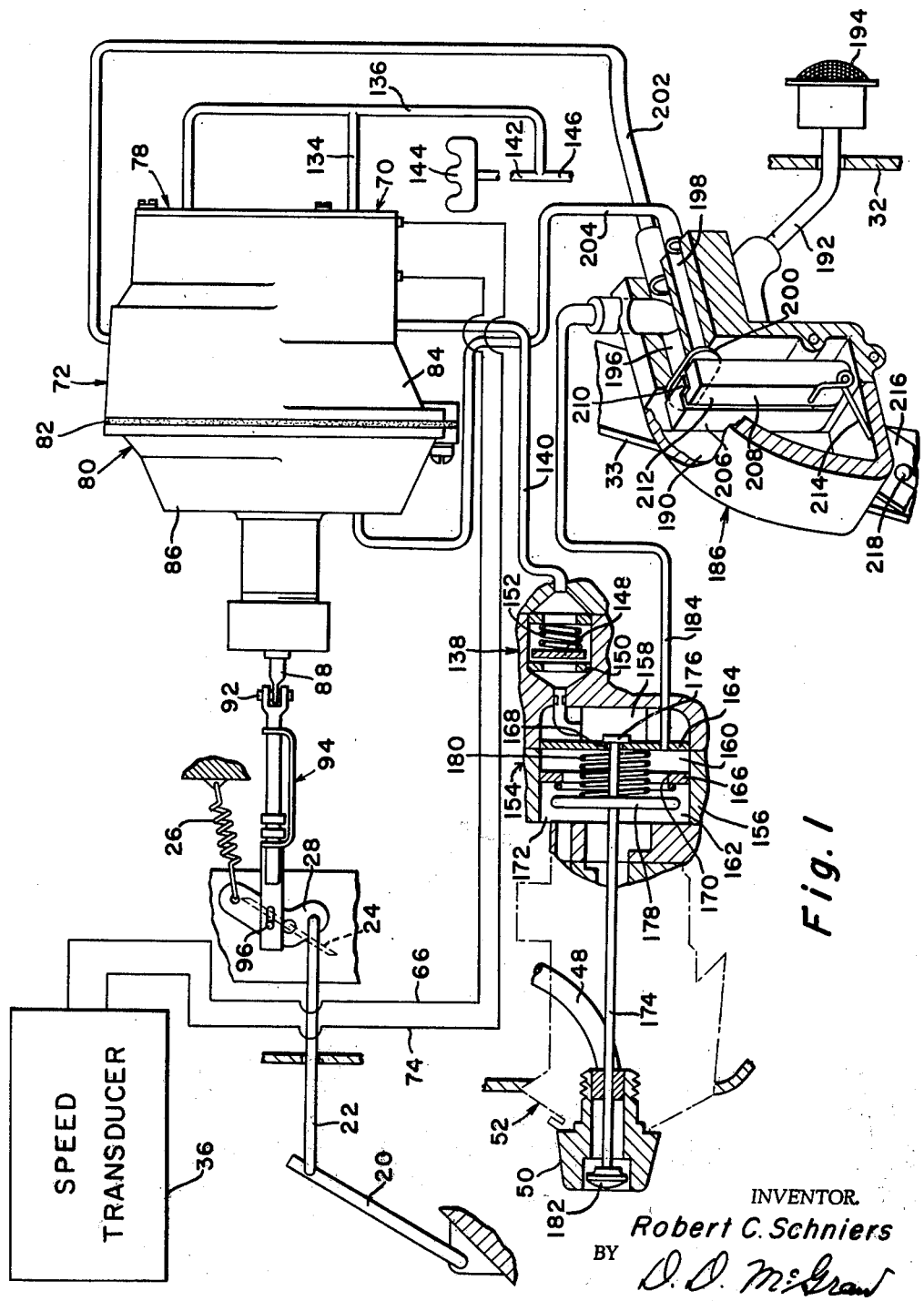
FIGURE 1 is a schematic diagram of a system utilizing a system and a valve embodying the invention and having certain elements thereof broken away and in section.

The vehicle cruise control system illustrated in FIGURE 1 is substantially identical to the system disclosed and claimed in the third of the above identified applications. Reference is therefore made to that application for details of construction and operation of the cruise control system as a whole. The usual accelerator pedal 20 is connected to a throttle rod 22 for control of the engine throttle valve 24 in the usual well known manner. A throttle return spring 26 is suitably attached to the throttle linkage of which arm 28 and rod 22 are parts, and urges the engine throttle valve 24 toward the zero throttle or engine idle position. Arm 28 is attached to the throttle valve so that it moves the valve under influence of throttle rod 22 and spring 26. The usual vehicle brake actuating pedal is suitably attached by pedal arm 33 to a portion of the vehicle such as wall 32 and a suitable brake pedal return spring urges the arm to the brake release position.

The speed transducer 36 senses vehicle speed and is set at the desired speed for either the speed warning or cruise control modes of operation by the speed set knob 50 of the control head 52 which acts through the drive member 48. The operation of the speed transducer 36 will generate an electrical proportional control or speed error signal to be transmitted to the electromagnet assembly in the proportional control valve section 70 through leads 66 and 74 and cause a fluid pressure proportional control signal to be generated in the power unit in the manner shown and described in the above noted applications.

The power unit 72 includes the proportional control valve section 70, the cruise mode section 78 and the power servo section 80. The power servo section includes a housing having a power diaphragm 82 separating the housing into a speed warning chamber section 84 and a cruise control chamber section 86. The servo rod 88 is connected to the diaphragm 82 and extends through the housing wall which has a suitable seal mounted therein. Rod 88 is pivotally connected at 92 to a lost motion linkage 94 which is attached to arm 28 of the throttle valve linkage through a suitable pin and slot arrangement 96. The details of the power unit 72 are found in the third of the above noted applications and reference is therefore made to that disclosure.

A conduit 134 connects the proportional control valve section 70 to the vacuum supply conduit 136 which in turn is connected through conduit 142 to a suitable source of vacuum such as the engine intake manifold 144. Conduit 146 may be connected to other suitable vacuum operated accessories on the vehicle. Conduit 136 is also connected to the cruise mode section 78.

A conduit 140 is connected to the control head 52 through the check valve assembly 138. Conduit 140 is the inhibiting function line of the system and communicates the fluid pressure from speed warning chamber section 84 to the control head 52. Check valve assembly 138 includes a valve 148, a valve seat 150 and a spring 152 urging the valve against the seat but permitting the valve to be held open when there is a sufficiently low pressure in conduit 140.

The control head 52 includes a control valve assembly 154 having a housing 156 divided into chambers 158, 160 and 162 by walls 164 and 166. An orifice 168 formed through wall 164 interconnects chambers 158 and 160 and an orifice 170 formed through wall 166 interconnects chambers 160 and 162. Chamber 162 is vented to the atmosphere at 172. A valve rod 174 extends through orifices 170 and 168 and is provided with a valve 176 which may close orifice 168 and a valve 178 which may close orifice 170. Spring 180 normally holds valve 178 in the open position and valve 176 in the closed position. Rod 174 has a button 182 on its other end which may be recessed in speed set knob 50 and may be pushed inwardly to engage the mechanism in the cruise control mode by closing valve 178 against wall 166 to close orifice 170 and opening valve 176 to open orifice 168. Details of the relationship of the speed control head 52 and the speed transducer 36 are also disclosed in the first two above noted applications to which reference may be made.

A conduit 184 is connected to chamber 160 and to the brake pedal release valve assembly 186. The atmospheric air inlet conduit 192 for valve assembly 186 may extend through the wall 32, which may be the firewall of the vehicle, and has a filter 194 at its intake end. When filter 194 is located out of the passenger compartment, any air intake noises originating in the valve assembly 186 will not be heard in the passenger compartment.

Valve assembly 186 is also provided with passages 196 and 198 connecting with chamber 190 and having their inner ends passing through a suitable sealing type valve seat 200. Conduit 184 is connected to passage 196 as is conduit 202. These two conduits together with passage 196 provide the cruise mode control circuit connecting control valve assembly 154 with the cruise mode section 78 of the power unit 72. Conduit 204 is connected to passage 198 of valve assembly 186 and to cruise control chamber section 86 of the power unit 72. This conduit provides a secondary release circuit directly to the power unit. A pair of pivot valves are pivotally mounted in chamber 190 of valve assembly 186 and include the cruise mode control valve 206 and the secondary release valve 208. Valves 206 and 208 are constructed in an overlapping manner so that the tongue 210 of valve 206 underlies and is separated from the tongue 212 of valve 208 when the valves are closed. They are normally held in the closed position by means of the brake return spring and spring 214 so that their outer ends engage the valve seat 200, with valve 206 closing off communication of passage 196 with chamber 190 and valve 208 closing off communication of passage 198 with chamber 190. A valve actuating arm 216 is attached to valve 206 and slidable engages a pin 218 on the brake pedal arm 33 so that brake engaging movement of arm 33 is transmitted through pin 218 and valve arm 216 to move valve 206 and open communication between passage 196 and chamber 190. Continued movement of the brake arm 33 results in continued movement of valve 206 against return spring 214 until the valve tongue 210 engages the valve tongue 212 of valve 208. Further opening movement of valve 206 opens valve 208 so that passage 198 also communicates with chamber 190. Upon release of the brake pedal the brake arm returns to the released position, carrying valve arm 216 with it and closing valve 206 and allowing return spring 214 to close valve 208.

In the speed warning vehicle underspeed condition valves 206 and 208 are closed and valve 178 is open so that chamber 160 is at atmospheric pressure, thereby keeping cruise mode control conduits 184 and 202 at atmospheric pressure together with passage 196 and chamber 160. Valve 176 is closed as is check valve 148. Cruise control chamber section 86, conduit 204, and passage 198 are at atmospheric pressure. Since atmospheric pressure is on both sides of diaphragm 82 the diaphragm exerts no force in either direction on the throttle linkage and the throttle valve 24 is under direct vehicle operator control through accelerator pedal 20.

As the vehicle reaches the set vehicle speed, speed transducer 36 sends an electrical proportional control or speed error signal to proportional control valve section 70, causing a decrease in the pressure in speed warning chamber section 84 in accordance with the speed error signal. The decrease in pressure in chamber section 84 will cause diaphragm 82 to move to the right, moving servo rod 88 with it. This exerts a back pressure force on the accelerator pedal 20 through linkage 94, pin and slot connection 96, arm 28 and throttle rod 22. If the operator continues to hold accelerator pedal 20 down so that the vehicle continues to maintain the overspeed or to accelerate further, lost motion linkage 94 permits relative movement between servo rod 88 and arm 28 so that the operator may maintain such a speed condition. However, he is acutely aware of the overspeed condition because of the additional force against his foot tending to close the throttle valve. The reduced pressure in chamber section 84 is transmitted through conduit 140 to open check valve 148 and provide the reduced pressure in chamber 158. Since valve 176 is closed, however, atmospheric pressure is maintained in chamber 160.

Should the operator desire to engage the system in the cruise control mode of operation upon reaching the set speed, he pushes button 182 inwardly until valve 178 closes orifice 170 while 176 opens orifice 168. Chamber 160 is then subjected to the reduced pressure in chamber 158 and this pressure acting on the area of valve 178 and cooperating with atmospheric pressure in chamber 162 holds the valve in position to maintain orifice 170 closed against the force of spring 180. The proportional control reduced pressure of chamber section 84 is then transmitted from chamber 160 through conduit 184, passage 196 and conduit 202 to the cruise control mode section 78. The full reduced pressure of raw intake manifold vacuum is transmitted to cruise control chamber section 86, where it acts on diaphragm 82 in oposition to the proportional control speed warning pressure in section 84 to balance that pressure with throttle return spring 26 and control the throttle valve 24 to maintain the vehicle at a constant road speed. This operation is described and disclosed in greater detail in the third of the above noted applications.

If while operating in the cruise control mode the operator desires to disengage the system from that mode of operation, he presses on the brake pedal so that mode control valve 206 is opened. The atmospheric pressure in chamber 190 is then received in passage 196 and mode control conduits 184 and 202. Atmospheric pressure then occurs in chamber 160, allowing valve 178 to move to the left under influence of spring 180 and closing valve 176. Atmospheric pressure is also transmitted to the cruise control mode section 78. Air under atmospheric pressure then passes to the power unit cruise control chamber section 86. This places the unit back in the cruise warning mode of operation. Chamber section 86 may also be directly evacuated if the brake arm 33 has been moved sufficiently to open secondary release valve 208. The atmospheric pressure of chamber 190 would then be connected directly to the chamber section 86 through passage 198 and conduit 204. In order to reengage the system in the cruise control mode the operator must again reach the set speed and push button 182.

Figure 2:
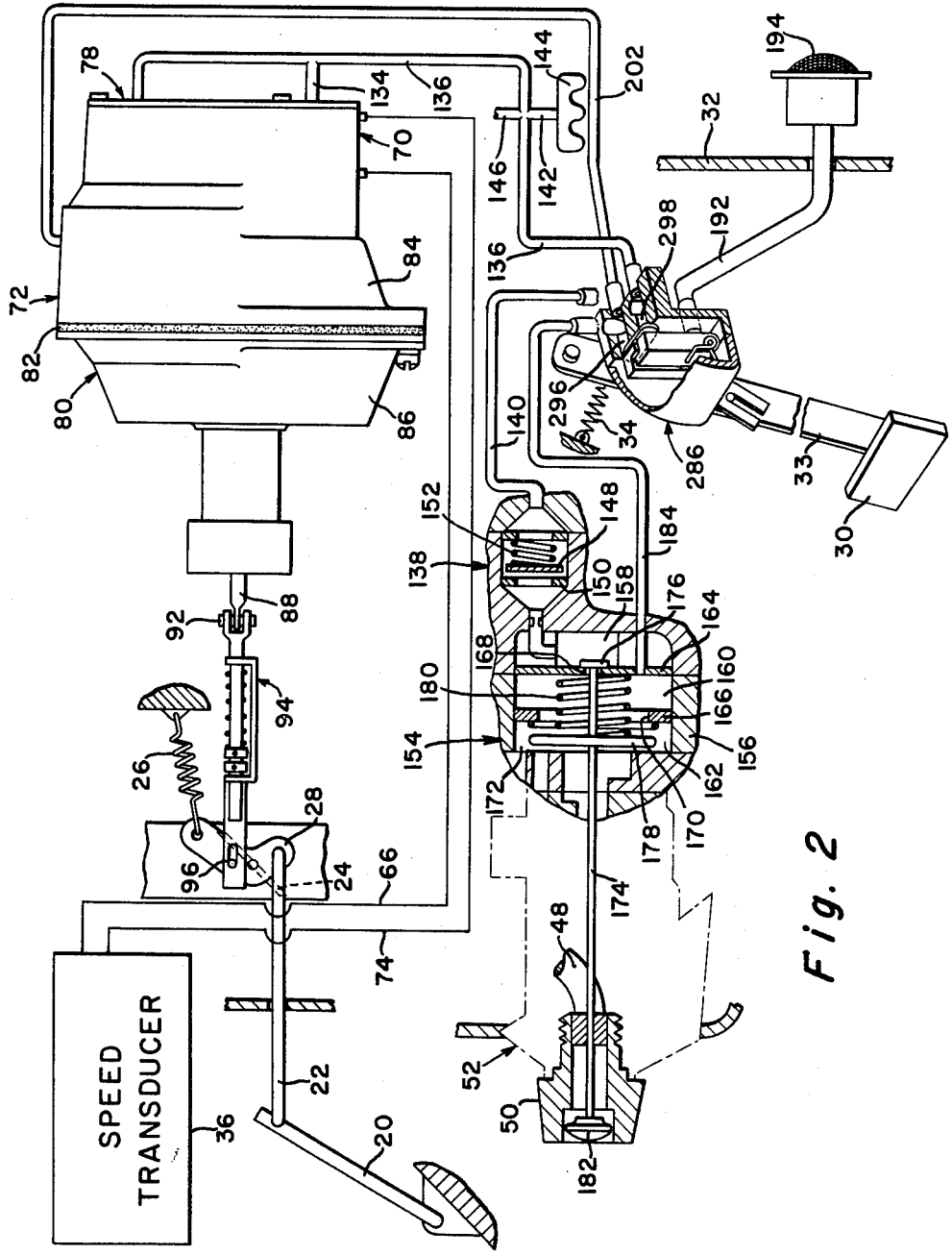
FIGURE 2 is a schematic diagram of a modified system utilizing a modified valve and embodying the invention and having certain elements thereof broken away and in section.

FIGURE 2 illustrates a modified system utilizing a modified brake release valve and is substantially identical to the vehicle cruise control system disclosed and claimed in the second of the above identified applications. Reference is therefore made to that application for details of construction and operation of the system as a whole. The system is similar to that of FIGURE 1, with the differences affecting the brake release valve being particularly described below. In FIGURE 2, conduit 140 is connected to a passage 298 in valve assembly 286 equivalent to passage 198 of the valve assembly of FIGURE 1. This passage is also connected to conduit 136. A passage 296 equivalent to passage 196 of the valve assembly 186 of FIGURE 1 is connected as in that figure to conduits 184 and 202. The valve assembly 286 of FIGURE 2 is otherwise constructed, arranged and controlled in the manner of valve 186 of FIGURE 1.

Figure 3:
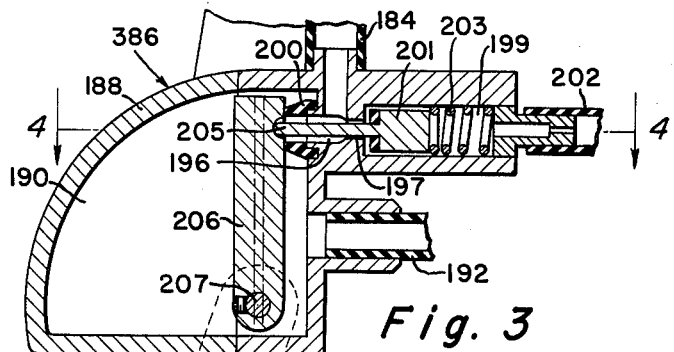
FIGURE 3 is a cross section view of a valve embodying the invention with parts broken away, which valve may be utilized in the system of FIGURE 2.
Figure 4:
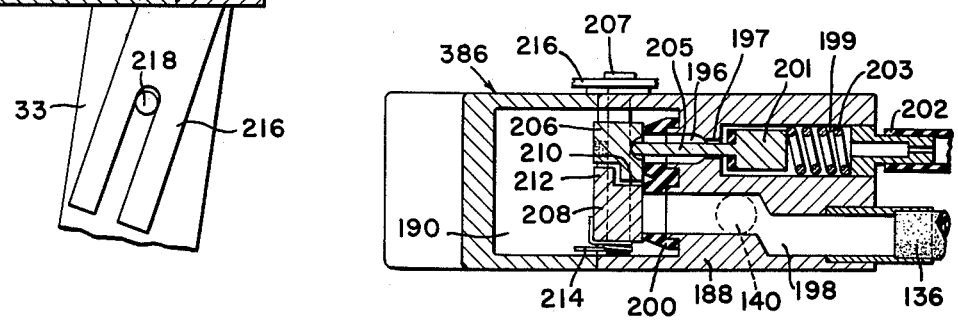
FIGURE 4 is a section view of the valve of FIGURE 3 taken in the direction of arrows 4–4 of that figure.
Figure 5:
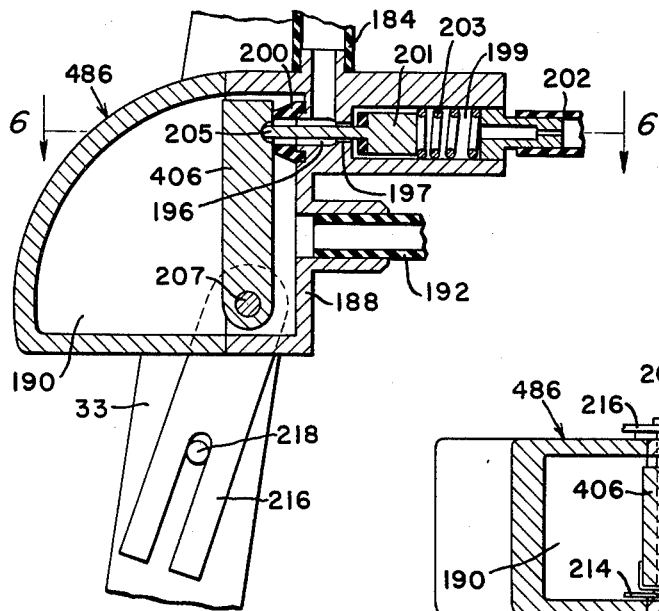
FIGURE 5 is a cross section view with parts broken away of another valve modification which may be utilized in the system of FIGURE 2.
Figure 6:
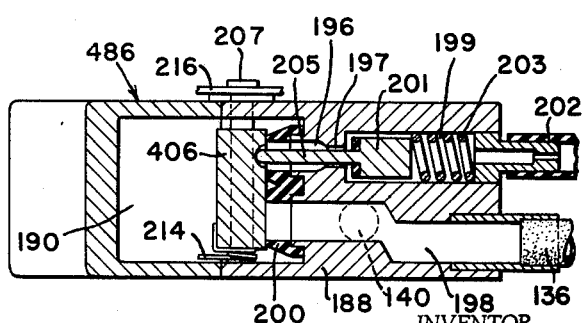
FIGURE 6 is a cross section view of the valve of FIGURE 5 taken in the direction of arrows 6–6 of that figure.

A modified form of the brake control valve assembly is illustrated in greater detail in FIGURES 3 and 4 and another form is similarly illustrated in FIGURES 5 and 6. The modifications are of generally similar construction except that the two valves are employed in FIGURES 3 and 4 to obtain separate operation of the mode control valve and the secondary release valve with a timing differential dependent upon the amount of brake pedal movement, while the modification of FIGURES 5 and 6 utilizes a single valve without the timing differential.

Referring now more particularly to the modification illustrated in FIGURES 3 and 4, the valve assembly 386 includes a housing 188 in which a chamber 190 is formed.

The atmospheric air inlet conduit 192 is connected to chamber 190 and maintains that chamber at atmospheric pressure. Passages 196 and 198 are also provided and connect with chamber 190 through the double orifice valve seat 200. Conduit 184 is connected to passage 196. An orifice 197 connects a piston valve chamber 199 formed in housing 188 with chamber 196. Conduit 202 is connected with chamber 199. A piston valve 201 is reciprocably received in chamber 199 and urged to close orifice 197 by spring 203. An extension 205 on piston 201 loosely extends through orifice 197 and the aligned opening of valve seat 200 so that it is in engagement with the mode control valve 206 when that valve is adjacent seat 200. When valve 206 sealingly engages seat 200, extension 205 is moved to the right as seen in FIGURES 3 and 4 so that valve 201 is unseated and chamber 199 is in communication with passage 196. When the valve assemblies of FIGURES 3 and 4, and FIGURES 5 and 6, are used in the system illustrated in FIGURE 2, conduits 184 and 202 together with passage 196 and chamber 199 provide the cruise mode control circuit connecting control valve assembly 154 with the cruise mode section 78 of the power unit 72. Conduit 204 is connected to passage 198 of the valve assembly and to the cruise control chamber section 86 of the power unit 72. This conduit provides a secondary release of the cruise control mode directly from the power unit.

Referring specifically to FIGURES 3 and 4, mode control valve 206 is mounted in chamber 190 of valve assembly 386 on the pivoting shaft 207 so as to be rotated thereby. A secondary release valve 208 is mounted to pivot relative to shaft 207 and to engage the portion of valve seat 200 to which passage 198 is connected to close that passage. Valves 206 and 208 are constructed in an overlapping manner so that the tongue 210 of valve 206 underlies and is separated from the tongue 212 of valve 208 when the valves are closed. This position is best illustrated by FIGURE 4. A return spring 214 normally holds valve 208 in the closed position and the brake release position of the brake pedal arm 33 acting through the pin 218 and the valve arm 216 holds valve 206 in the closed position against valve seat 200. Valve arm 216 is nonrotatably secured to shaft 207 so that movement of brake pedal arm 33 is reflected by movement of valve 206.

With the outer ends of valves 206 and 208 engaging valve seat 200, valve 206 closes off communication of passage 196 with chamber 190 and valve 208 closes off communication of passage 198 with chamber 190. Valve 206 also holds valve 201 away from orifice 197 so that conduits 184 and 202 are in communication through passage 196 and chamber 199. Brake engaging movement of brake pedal arm 33 moves valve 206 to open communication between passage 196 and chamber 190 and allows spring 203 to close valve piston 201 against orifice 197. Continued movement of the brake arm 33 results in continued opening movement of valve 206 until the valve tongue 210 engages the valve tongue 212 of valve 208. Further opening movement of valve 206 opens valve 208 so that passage 198 also communicates with chamber 190. Upon release of the brake pedal the brake arm 33 returns to the brake released position, carrying valve arm 216 with it, seating valve 206 and allowing return spring 214 to seat valve 208.

The modified valve assembly 486 illustrated in FIGURES 5 and 6 is substantially identical to that illustrated in FIGURES 3 and 4 except for the construction of the valve 406. This valve is secured to shaft 207 and incorporates into a single element the valves 206 and 208 of FIGURES 3 and 4 so that simultaneous opening of passages 196 and 198 is accomplished upon brake pedal movement.

I claim:

1. A fluid pressure system having a fluid pressure circuit including; a fluid pressure source; a control valve; a servo interconnected in series with said source and said control valve; and a valve assembly having a first section in fluid connection in said circuit intermediate said control valve and said servo, a second section in selective fluid connection with said first section and fluid connected with said servo, exhaust vent means, and valve means for selectively fluid connecting and disconnecting said first section and said second section to said exhaust vent means.

2. The fluid pressure system of claim 1, said valve means comprising apertured valve seat means having first and second apertures respectively fluid connected to said first and second sections for exhaust vent control thereof, a valve chamber connected with said apertures and said exhaust vent means, and aperture controlling means received in said valve chamber and movable therein to seat and unseat on said valve seat means to close and open said apertures to said exhaust vent means through said chamber.

3. The fluid pressure system of claim 2, said aperture controlling means comprising a single valve element simultaneously controlling both of said apertures.

4. The fluid pressure system of claim 2, said aperture controlling means comprising first and second valve elements respectively controlling said apertures.

5. The fluid pressure system of claim 4, said first and second valve elements having lost motion interlocking means, and means for moving said first valve element to open said first aperture, said lost motion interlocking means permitting limited opening movement of said first valve element independently of said second valve element and then engaging said first and second valve elements whereby further movement of said first valve element in the aperture opening direction moves said second valve element to open said second aperture.

6. The fluid pressure system of claim 1, said first valve assembly section having a check valve therein intermediate said control valve and said servo and means for opening and closing said check valve operable by said valve means to open said check valve when said first section is connected to said exhaust vent means.

7. A fluid pressure system having first and second fluid pressure operable members connected to a source of fluid pressure other than atmospheric pressure and a valve control assembly; comprising a housing having a valve operating chamber formed therein and maintained at atmospheric pressure, an atmospheric pressure inlet for said chamber, first and second apertures connected with said chamber and respectively fluid connected to said first and second fluid pressure operable members, valve seat means surrounding said apertures, normally closed valve means disposed and operable in said valve operating chamber for opening and closing said apertures by disengagement from and engagement with said valve seat means, and valve actuating means operatively secured to said valve means for opening said apertures into fluid communication with said atmospheric pressure-maintained valve operating chamber.

8. The fluid pressure system of claim 7, said first and second apertures being in axially spaced but juxtaposed relation and said valve seat means having surface means engageable by said valve means positioned in a common plane.

9. The fluid pressure system of claim 7, said valve means comprising a single valve element simultaneously opening both of said apertures and simultaneously closing both of said apertures.

10. The fluid pressure system of claim 7, said valve means comprising first and second valve elements respectively controlling said first and second apertures.

11. The fluid pressure system of claim 7, one of said apertures having a check valve therein and check valve operating means for opening and closing said check valve operable by said valve means to open said check valve when said one aperture is closed and to close said check valve only after said one aperture has been opened into fluid communication with said valve-operating chamber.

12. A fluid pressure system having a fluid pressure circuit including: a fluid pressure source; a control valve; a servo interconnected in series with said source and said control valve; and valve assembly means having a first assembly section in fluid connection in said circuit intermediate said control valve and said servo, a second assembly section fluid connected intermediate said source and said control valve and selectively connecting said control valve and said source, exhaust vent means, and valve means selectively fluid connecting and disconnecting said first and second assembly sections to said exhaust vent means.

13. A fluid pressure system valve control assembly comprising a housing having a valve operating chamber formed therein and maintained at atmospheric pressure, an atmospheric pressure inlet for said chamber, first and second apertures connected with said chamber and adapted to be connected to separate lines of a fluid pressure system, valve seat means surrounding said apertures, normally closed valve means comprising first and second valve elements disposed and operable in said valve operating chamber for respectively opening and closing said first and second apertures by disengagement from and engagement with said valve seat means, valve actuating means operatively secured to said valve means for opening said apertures into fluid communication with said atmospheric pressure-maintained valve operating chamber, said first and second valve elements having lost motion interlocking means, means urging said second valve element to an aperture-closed position, and means operatively connected with said first valve element and urging said first valve element to an aperture-closed position and having a manually operable member for moving said first valve element to open said first aperture, said lost motion interlocking means permitting limited movement of said first valve element in free relation to said second valve element and then engaging said first and second valve elements whereby further movement of said first valve element by said manually operable member in the aperture-opening direction moves said second valve element to open said second aperture.

References Cited by the Examiner
UNITED STATES PATENTS

| | | | |
|---|---|---|---|
| 2,377,256 | 5/45 | Mallory | 123—103 |
| 2,654,388 | 10/53 | Glass | 137—527.8 |
| 2,717,806 | 9/55 | Dale | 137—607 |
| 2,837,060 | 6/58 | Teetor | 180—82.1 XR |
| 2,853,099 | 9/58 | Eitel | 137—595 |
| 3,088,538 | 5/63 | Brennan | 123—103 XR |
| 3,114,427 | 12/63 | Thorner | 123—103 XR |

LAVERNE D. GEIGER, *Primary Examiner.*

ISADOR WEIL, *Examiner.*